Sept. 5, 1933.   C. E. SWENSON   1,925,419
SHAFT CONNECTION FOR UNIVERSAL JOINT ASSEMBLIES
Filed Nov. 28, 1927
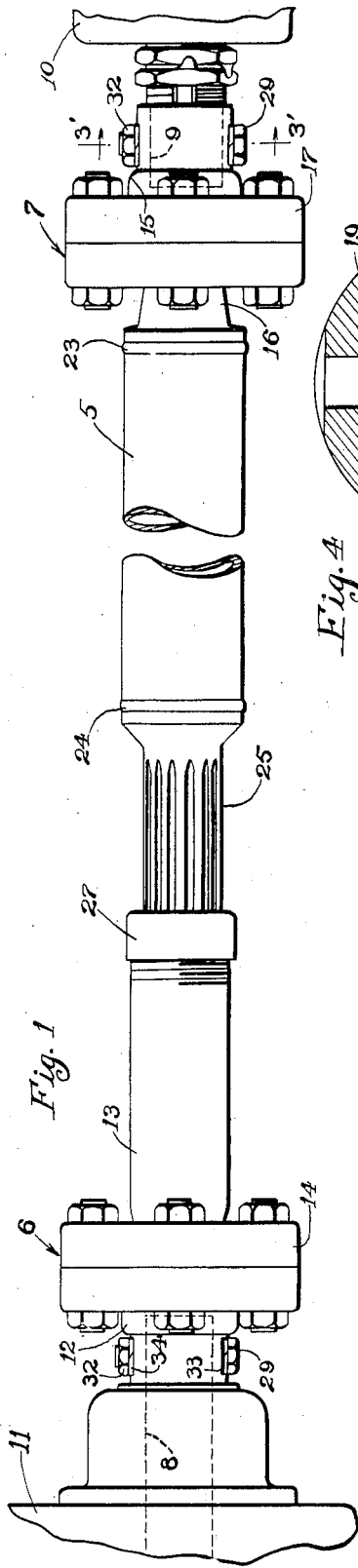
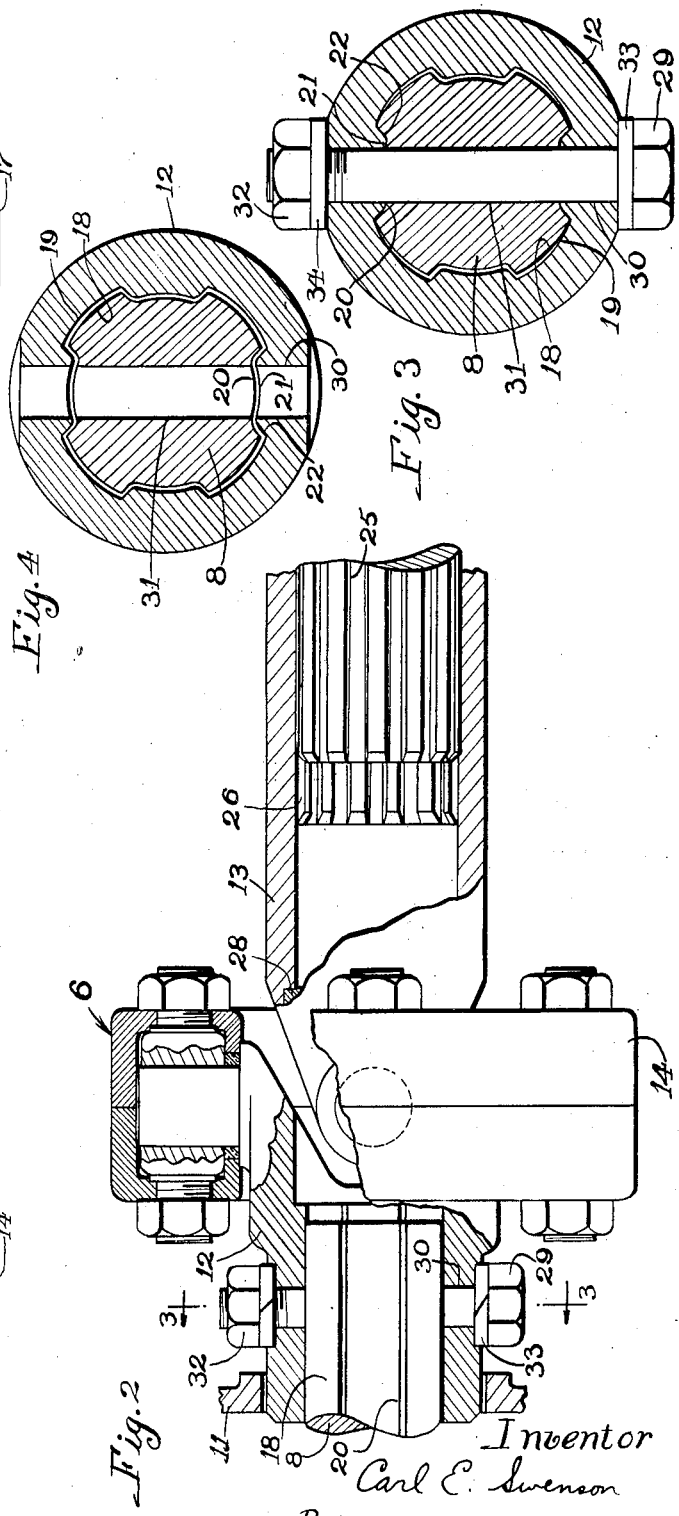
Inventor
Carl E. Swenson
By Wilson & McCanna
Atty's Patented Sept. 5, 1933

1,925,419

UNITED STATES PATENT OFFICE 1,925,419

SHAFT CONNECTION FOR UNIVERSAL JOINT ASSEMBLIES

Carl E. Swenson, Rockford, Ill., assignor, by direct and mesne assignments, to Mechanics Universal Joint Company, Rockford, Ill., a corporation of Illinois Application November 28, 1927
Serial No. 236,028

2 Claims. (287—110)

This invention relates to the propeller shaft group of the power transmission of a motor vehicle or what is usually known as the universal joint assembly, and has particular reference to a novel shaft connection therefor.

Prior to my invention it has been the practice to connect the transmission shaft with the differential pinion shaft through a universal joint assembly composed of a front and a rear universal joint with an interposed propeller shaft or tube, wherein at least one, if not both, of the connections between the universal joints and the shafts comprised flanged coupling members bolted together. The cost of these flanged couplings is only one serious objection to their use. There is also the objection that the bolting of these couplings consumed considerable time, as will be readily appreciated when it is considered that at least six bolts were commonly used in joining each of these couplings. Attempts have been made to eliminate one or both sets of the flanged coupling members but so far as I am aware certain of these constructions proposed have been more or less complicated and impractical or even necessitated the disassembling of either one or both of the universal joints at the time of installation or removal of said assembly. It is, therefore, the principal object of my invention to provide a new form of shaft connections for a universal joint assembly which eliminates both sets of flanged coupling members in a simple and thoroughly practical construction and one which offers a great saving in time in assembling as well as a saving in cost of manufacture.

It has also been the practice prior to my invention to connect either one or both of the shafts referred to to the yokes of the universal joints themselves or to the flanged coupling members by tapering the shafts to fit into the yokes or coupling members to make a key connection therewith and employing nuts threading onto the ends of the shafts to complete the connections. This also involved considerable cost both in manufacture and assembling. It is, therefore, a further object of my invention to eliminate this type of connection entirely and to provide one which is cheaper to manufacture, is much easier to assemble, and will, furthermore, stand heavier loads. I prefer to employ combination spline and bolt connections of a novel character which can be completed or disassembled with the utmost ease and facility but, nevertheless, afford good permanent driving connections and such as will withstand the heaviest loads and the severe strains incident to sudden accelerations of the car.

The invention is illustrated in the accompanying drawing in which—

Figure 1 is a side elevation of a universal joint assembly made in accordance with my invention, a part of the tubular propeller shaft being broken away;

Fig. 2 is an enlarged central sectional detail through the front end of the assembly, showing the connection between the front universal joint and the transmission shaft;

Fig. 3 is an enlarged cross-section taken on the line 3—3 of Fig. 2 showing in an exaggerated manner the effect of the tightening of the bolt on the spline connection; and Fig. 4 is a similar section with the bolt removed.

The principal parts of the propeller shaft section of a motor car power transmission are, as illustrated, the propeller shaft or tube 5, and the front and rear universal joints 6 and 7 connected, respectively, to the front and rear ends of said shaft. These parts are interposed between and connected to the transmission shaft 8 and the differential pinion shaft 9, or equivalent shafts. Said shafts are in normally fixed spaced relation but are relatively movable in the up and down movement of the differential casing 10 relative to the casing 11 of the transmission, as is well known.

As stated above, it has heretofore been the practice to connect either one or both of the universal joints 6 and 7 with the shafts 8 and 9, respectively, by means of flanged couplings bolted together. The principal object of the invention, as briefly explained above, is to provide a practical assembly without these couplings and without the necessity of disassembling either of the universal joints in the installation or removal of said assembly. Also, as stated above, the practice has been to connect the shafts 8 and 9 to the flanged couplings or to the yokes of the universal joints by keying said parts on tapered ends provided on said shafts and employing nuts to hold the keyed parts together. My invention contemplates the avoidance of that type of connection and the provision of combination spline and bolt connections directly between the universal joints and the shafts. The universal joints employed, as will presently appear, might be of any suitable construction, although I prefer to employ the trunnion type having terminal yoke members. The particular type of universal joint shown is one wherein the trunnions are carried by the yokes and connected by an oil-tight ring, this construction being covered in Patent No. 1,450,707, issued April 3, 1923.

The outer and inner yokes of the front joint 6 are designated 12 and 13, respectively, and are interconnected by a two-piece oil-tight ring 14 while the corresponding yokes of the rear joint 7 are designated 15 and 16 and are interconnected by a two-piece oil-tight ring 17. According to my invention the outer yoke 12 of the front universal joint 6 is splined directly on the transmission shaft 8, the splines 18 thereof being received in grooves 19 provided in the yoke 12 while the intermediate grooves 20 thereof receive the splines 21 of said yoke, the latter having beveled lateral edges, as shown at 22, for a purpose presently to appear. The connection between the yoke 15 of the rear universal joint 7 and the differential pinion shaft 9 is of identical form so that the section shown in Fig. 3 also corresponds to a section taken on the line 3'—3' of Fig. 1. The tubular shaft 5 which, for simplicity and economy in construction, is welded at 23 to the inner yoke 16 of the rear universal joint 7 and also welded at 24 to a splined stub shaft section 25, has a slip connection with the inner yoke 13 of the front universal joint 6 by the reception of the splined shaft section 25 in the splined portion 26 of the yoke 13. The nut appearing at 27 holds packing which excludes dirt from the splined connection, a plate 28 being provided to close the other end of said yoke for a similar purpose. As thus far described, it will appear that my invention provides for quick assembling or disassembling by the splining of the yokes 12 and 15 on the shafts 8 and 9, respectively. The yoke 13 is sufficiently elongated that the splined connection with the propeller shaft 5 affords not only the full range of telescoping action associated in the actual operation of the assembly, but also permits of the sliding of either of the yokes 12 or 15 onto or off from the shafts to which they are arranged to be secured. It will be apparent that very little time is required in the installation of the assembly up to this point. Very little additional time is required to complete the installation, there being only two bolts to insert and tighten, as will now be described.

Two bolts 29 are arranged to be passed through the two splined connections above described to complete the installation. These bolts, as shown in Fig. 3, are arranged to be passed through bolt holes 30 provided in the yokes registering with bolt holes 31 provided in the shafts, the bolt holes being provided so they pierce diametrically opposed splines 21 of the yokes and correlated grooves 20 of the shafts. The purpose in this is to cause the wedging of the splines in the grooves when the nuts 32 are tightened on the bolts 29. This wedging action is caused by a slight amount of distortion of the yokes. While the distortion may not amount to more than about a few thousandths of an inch it is shown in a very exaggerated fashion in Fig. 3 in order that the action may be readily understood. The wedging of the splines 21 in the grooves 20 is due to the beveled lateral edges 22 of the splines 21 in a manner believed to be self-evident. This makes a very solid connection and a good permanent driving connection as well, capable of withstanding the heaviest loads and the stresses incident to the sudden acceleration of the car. It is believed evident that the connection is a vast improvement over the ordinary key connection such as was used in the past inasmuch as there is not the slightest danger of shearing under slight overloads. Lock washers 33 and 34 are suitably provided under the heads of the bolts 29 and under the nuts 32 to guard against the loosening of the bolts when the assembly is in service.

It is believed that the foregoing description conveys a clear understanding of my invention and of its many advantages over prior constructions not only from the standpoint of cost but from the standpoint of ease in assembling or disassembling. As compared with the type of universal joint assembly where two sets of coupling flanges were employed the great saving in time derived as a result of my invention will readily be appreciated inasmuch as there are only two bolts to be applied in the present case as compared with at least twelve in the other case. And, of course, where only a single set of coupling flanges is employed the present invention still affords the advantage that there are but two bolts to apply as compared with six in such a construction. Aside from the advantages from the standpoint of bolting there is, of course, the further advantage that the spline connections can be made in a fraction of the time otherwise necessitated with the taper, key, and nut connections.

I claim:

1. The combination of a shaft and a sleeve adapted to fit over the end of said shaft for connection therewith, the sleeve and shaft having an interfitting spline and groove provided therein, the spline in the sleeve having beveled edges and the groove in the shaft being of complementary form, the sleeve being of a size normally to slip on or off the shaft, and a bolt entered sidewise through registering holes in the sleeve and shaft between the beveled edges of the aforesaid spline, whereby in the tightening of said bolt to distort the sleeve and wedge the spline in the groove and form a solid drive transmitting connection between the sleeve and shaft.

2. The combination of a shaft and a sleeve adapted to fit over the end of said shaft for connection therewith, the sleeve and shaft having diametrically opposed interfitting splines and grooves provided therein, the splines in the sleeve having beveled edges and the grooves in the shaft being of complementary form, the sleeve being of a size normally to slip on or off the shaft, and a bolt entered sidewise through registering holes in the sleeve and shaft between the beveled edges of the aforesaid splines, whereby in the tightening of said bolt to distort the sleeve and wedge the splines in the grooves and form a solid drive transmitting connection between the sleeve and shaft.

CARL E. SWENSON.